ated Dec. 25, 1956

2,775,602

THIOSTEROID PRODUCTION

John C. Babcock and Arnold C. Ott, Kalamazoo, Mich., assignors to The Upjohn Company, Kalamazoo, Mich., a corporation of Michigan No Drawing. Application June 5, 1953,
Serial No. 359,965

6 Claims. (Cl. 260—397.3)

This invention relates to a process for the production of certain thiosteroids, and is more particularly concerned with a process for the reaction of a polyketo steroid possessing a $\Delta^4$-3-keto group with a mercaptan in the presence of a boron trifluoride catalyst.

It is an object of the present invention to provide a process for the reaction of a mercaptan with a polyketo steroid possessing a $\Delta^4$-3-keto group using boron trifluoride as the reaction catalyst to produce a 3-thiosteroid by selective conversion of the 3-keto group to a 3-thio group. Other objects will be apparent to one skilled in the art to which this invention pertains.

It is known in the art to react a mercaptan with steroid 3, 7 and 17-ketones in the presence of zinc chloride and sodium sulfate [Bernstein et al., J. Am. Chem. Soc., 68, 1152 (1946); Hauptmann, ibid., 69, 562 (1947); Norymberska et al., ibid., 70, 1256 (1948); Levin et al., ibid., 70, 3140 (1948); Los, ibid., 72, 2281 (1950)], pyridine hydrochloride [Djerassi et al., ibid., 71, 3689 (1949); 73, 1528 (1951)], and hydrogen chloride [Rolls et al., ibid., 71, 3320 (1949)].

We have found that boron trifluoride can be used as the reaction catalyst in the reaction of a mercaptan with a $\Delta^4$-3-keto steroid, having in the molecule at least one additional keto group, to selectively convert the 3-keto group to a thio group, i. e., a thio enol ether or a mercaptol. Not only has boron trifluoride proven to be a highly effective and efficient catalyst for this reaction, but additionally, in spite of the highly reactive nature of the catalyst, the reaction is a selective one, reacting substantially completely with the 3-keto group before reaction takes place with the other keto group or groups present in the steroid nucleus. The use of boron trifluoride catalyst in preference over the catalysts of the prior art is usually accompanied by a substantial increase in yield of thiosteroid. For example, when 11-ketoprogesterone is reacted with benzyl mercaptan in the presence of pyridine hydrochloride, the yield of 3-thio enol ether is about 55 percent of the theoretical. Replacing the pyridine hydrochloride with boron trifluoride etherate in the same reaction increases the yield of 3-enol ether to greater than ninety percent of the theoretical. Moreover, when boron trifluoride is used as the reaction catalyst, the reaction conditions necessary for a satisfactory yield of thiosteroid are milder than those required when the catalyst of the prior art are employed. Frequently, where refluxing temperatures with concomitant removal of the water of reaction were heretofore necessary, the use of boron trifluoride as the reaction catalyst has permitted the reaction to be performed at room temperature without removal of the water of reaction. Comparative reactions using pyridine hydrochloride and boron trifluoride etherate, respectively, as reaction catalysts are given in the examples hereinafter. A further advantage in the use of boron trifluoride as the reaction catalyst is found in the fact that boron trifluoride as its etherate is soluble in most of the common organic solvents and, accordingly, the choice of reaction solvents is wider using the catalyst of the present invention than was previously possible.

The present invention involves the reaction of a $\Delta^4$-3-keto steroid, having in the molecule at least one additional keto group, with a mercaptan in the presence of a boron trifluoride catalyst to selectively convert the 3-keto group to a thio group, i. e., a thio enol ether or a thio ketal. The boron trifluoride is usually most conveniently employed as the etherate.

A preferred aspect of the present invention comprises reacting a $\Delta^4$-3-keto steroid, having in the molecule at least one additional keto group unconjugated with a double bond, with a mercaptan in an organic solvent and in the presence of a boron trifluoride reaction catalyst to selectively convert the 3-keto group to a 3-thio group. Of the mercaptans, benzyl mercaptan is preferred. Usually, the reaction solvent is an alkanol, especially methanol, since frequently high yields of product are precipitated from the solvent as the reaction proceeds thereby eliminating the laborious and unpleasant task of separating the steroid product from foul smelling material.

As stated before, the reaction product may be a thio enol ether, a thio ketal, or a mixture of these products depending, at least in part, upon the reaction temperature. Temperatures above room temperature, i. e., above about 25 degrees centigrade, appear to promote the production of the thio enol ether, whereas the thio ketal is usually produced when the reaction temperature is about room temperature or lower.

Known $\Delta^4$-3-keto steroids having in the molecule at least one additional keto group and the same mercaptans which have already been employed in thio enol ether or mercaptol formation reactions can be employed when boron trifluoride is used as the reaction catalyst. Steroids which may be used include progesterone, 11$\alpha$-hydroxyprogesterone, 11-ketoprogesterone, 17$\alpha$-hydroxyprogesterone, 21-hydroxyprogesterone or 21-ester thereof, 17$\alpha$,21-dihydroxyprogesterone, 11-keto-17$\alpha$-hydroxy-21-acetoxyprogesterone, adrenosterone, $\Delta^4$-androstene-3,17-dione, 11$\beta$-hydroxy-4-androstene-3,17-dione, and many others. Mercaptans which may be used include benzyl mercaptan, ethyl mercaptan, mercaptoacetic acid, and ethylenedithiol, especially benzyl mercaptan.

The reaction solvent usually includes methanol although ethanol, acetic acid, methylene chloride, benzene, ethyl acetate, ether, cyclohexanone, acetone, dioxane, combinations of these, and other common organic solvents may also be used. Reaction temperatures from about zero degrees centigrade to the boiling point of the reaction mixture may be employed, although it is to be understood that the composition of the resulting reaction product may not necessarily be the same at the extremes of this temperature range.

The following examples are illustrative of reactions which employ boron trifluoride as the reaction catalyst and the products thus produced, but are not to be construed as limiting.

Example 1.—benzylthio-3,5-pregnadiene-11,20-dione

A. USING BORON TRIFLUORIDE AS THE REACTION CATALYST

Twenty grams (0.061 mole) of 11-ketoprogesterone in twenty milliliters of methylene chloride was mixed with 150 milliliters of methanol, eight milliliters of benzyl mercaptan and five milliliters of boron trifluoride (as the etherate) was added, and the resulting mixture maintained at fifty degrees centigrade. Crystallization commenced soon after the mixing and, after 1.5 hours, the solution was cooled and the precipitate filtered to yield, in two crops, 24 grams of 3-benzylthio-3,5-pregnadiene-11,20-dione, the first of which melted at 158 to 160 and the second at 155 to 160 degrees centigrade. These two crops represent a yield of 90.6 percent of the theoretical.

In the same manner, 3-benzylthio-11α-hydroxy-3,5-pregnadiene-20-one and 3-benzylthio-11β-hydroxy-3,5-pregnadiene-20-one are prepared by substituting 11α-hydroxyprogesterone and 11β-hydroxyprogesterone, respectively, for the 11-ketoprogesterone used therein as the starting steroid.

B. USING PYRIDINE HYDROCHLORIDE AS THE REACTION CATALYST

A mixture of forty milliliters of ethanol, 125 milliliters of benzene, and 8.6 grams (0.026 mole) of 11-ketoprogesterone was heated to the reflux temperature and 25 milliliters of distillate were removed, whereafter six milliliters (0.048 mole) of benzyl mercaptan and one gram of pyridine hydrochloride were added and the resulting mixture refluxed for five hours. A large portion of the reaction solvent was removed by distillation at reduced pressure and 100 milliliters of methanol was added to the residue, whereupon 3-benzylmercapto-3,5-pregnadiene-11,20-dione commenced to precipitate from the mixture immediately. The whole was cooled for sixteen hours in a refrigerator and the resulting precipitated crystals removed by filtration and then dried in a vacuum desiccator. The yield of 3-benzylthio-3,5-pregnadiene-11,20-dione melting at 151 to 154 degrees centigrade was 5.9 grams, a yield of 55 percent of the theoretical.

*Example 2.—3-benzylthio-3,5-androstadiene-11,17-dione*

To a refluxing solution of three grams (0.01 mole) of adrenosterone in five milliliters of methylene chloride and 7.5 milliliters of methanol was added two drops of boron trifluoride (as its etherate) followed immediately thereafter over a period of fifteen minutes by a solution of 1.22 milliliters of benzyl mercaptan and five drops of boron trifluoride etherate in 7.5 milliliters of methanol. Refluxing was continued for an additional twenty minutes during which time product began to precipitate. The mixture was slowly cooled to room temperature and finally chilled for several hours. The precipitated product was filtered, washed with two five-milliliter portions of cold methanol and dried to yield 3.05 grams of 3-benzylthio-3,5-androstadiene-11,17-dione melting at 148 to 153 degrees centigrade. An additional 0.6 gram of this product was isolated from the mother liquors to afford a total yield of ninety percent of the theoretical.

Several recrystallizations of this product yielded crystals melting at 163 to 164 degrees centigrade, having a rotation $[\alpha]_D^{23}$ of minus thirteen degrees, an ultraviolet $\lambda_{max}$. in ethanol of 270 m$\mu$ (17,350), and the analysis given below.

*Analysis.*—Calculated for $C_{26}H_{30}O_2S$: C, 76.77; H, 7.43; S, 7.89. Found: C, 76.93; H, 7.33; S, 7.91.

*Example 3.—3,3-dibenzylthio-4-androstene-11,17-dione*

A solution of 302 milligrams (0.001 mole) of adrenosterone, 5.4 milliliters of 0.67 molar solution of benzyl mercaptan in methanol, four drops of boron trifluoride etherate and one milliliter of methylene chloride was maintained at room temperature for about eight hours, during which time clusters of flat needles gradually precipiated from the solution. The mixture was cooled slightly and filtered. The precipitated crystals were washed with several milliliters of cold methanol followed by aqueous methanol and then dried to yield 373 milligrams, a yield of 68 percent of the theoretical, of 3,3-dibenzylthio-4-androstene-11,17-dione melting at 176 to 186 degrees centigrade with sintering at 150 degrees, having an $[\alpha]_D^{23}$ of plus 169 degrees and the analysis given below. Since the thio ketal appears to melt with loss of benzyl mercaptan to produce the corresponding thio enol ether, the product, even when pure, does not have a sharp melting point.

*Analysis.*—Calculated for $C_{34}H_{40}O_2S_2$: C, 74.95; H, 7.40; S, 11.77. Found: C, 74.45; H, 7.28; S, 12.14.

*Example 4.—3-benzylthio-3,5-androstadiene-17-one*

To a solution of 286 milligrams (0.001 mole) of androstene-3,17-dione in 0.5 milliliter of methylene chloride was added 1.65 milliliters of a 0.67 molar solution of methanolic benzyl mercaptan and three drops of boron trifluoride as its etherate. The mixture was heated to 55 degrees centigrade for five minutes during which time long colorless needles precipitated from the solution. After cooling to room temperature, the mixture was chilled to yield, in two crops, 306 milligrams, a yield of 78 percent of the theoretical, of 3-benzylthio-3,5-androstadiene-17-one melting at 175 to 178 degrees centigrade and having a $\lambda_{max}$. in ethanol of 269 m$\mu$ (18,375).

Similarly, the thio ketals and thio enol ethers, especially the benzyl thio enol ether, of other compounds such as, for example, 11β-hydroxy-4-androstene-3,17-dione, testosterone, 19-normethyltestosterone, corticosterone acetate, hydrocortisone, corticosterone, and others are prepared according to the methods described in the preceding examples.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. The process which comprises reacting a $\Delta^4$-3-keto steroid, selected from $\Delta^4$-3,20-diketopregnenes and $\Delta^4$-3,17-diketoandrostenes, with benzyl mercaptan in an organic solvent and in the presence of a boron trifluoride reaction catalyst to selectively convert the 3-keto group to a 3-thio group.

2. The process of claim 1 wherein the organic solvent is an alkanol.

3. The process of claim 1 wherein the reaction is conducted above about 25 degrees centigrade.

4. The process which comprises reacting 11-ketoprogesterone with benzyl mercaptan at a temperature above 25 degrees centigrade and in the presence of boron trifluoride to produce 3-benzylthio-3,5-pregnadiene-11,20-dione.

5. The process which comprises reacting $\Delta^4$-androstene-3,17-dione with benzyl mercaptan at a temperature above 25 degrees centigrade and in the presence of boron trifluoride to produce 3-benzylthio-3,5-androstadiene-17-one.

6. The process which comprises reacting adrenosterone with benzyl mercaptan at a temperature above 25 degrees centrigrade and in the presence of boron trifluoride to produce 3-benzylthio-3,5-androstadiene-11,17-dione.

References Cited in the file of this patent

UNITED STATES PATENTS

| | | |
|---|---|---|
| 2,435,013 | Miescher | Jan. 27, 1948 |
| 2,451,434 | Dorfman | Oct. 12, 1948 |

OTHER REFERENCES

Chem. Abst. 43, col. 8251 (1949).